(12) United States Patent
Koga (10) Patent No.: US 7,912,377 B2
(45) Date of Patent: Mar. 22, 2011

(54) VISIBLE LIGHT COMMUNICATION APPARATUS AND VISIBLE LIGHT COMMUNICATION METHOD

(75) Inventor: Hisao Koga, Fukuoka (JP)

(73) Assignee: Panasonic Corporation, Osaka (JP)

( * ) Notice: Subject to any disclaimer, the term of this patent is extended or adjusted under 35 U.S.C. 154(b) by 702 days.

(21) Appl. No.: 11/591,677

(22) Filed: Nov. 2, 2006

(65) Prior Publication Data

US 2007/0104239 A1    May 10, 2007

(30) Foreign Application Priority Data

Nov. 4, 2005    (JP) .............................. P. 2005-321126

(51) Int. Cl.
*H04B 10/00*    (2006.01)
*H04B 10/08*    (2006.01)

(52) U.S. Cl. ........................................ 398/172; 398/17
(58) Field of Classification Search .................... 398/17, 398/172
See application file for complete search history.

(56) References Cited

U.S. PATENT DOCUMENTS

| 2002/0167701 | A1 | | 11/2002 | Hirata | |
|---|---|---|---|---|---|
| 2004/0212481 | A1 | * | 10/2004 | Abraham | 340/310.01 |
| 2006/0038506 | A1 | * | 2/2006 | Rose et al. | 315/247 |
| 2006/0044652 | A1 | | 3/2006 | Yamamoto | |
| 2006/0056855 | A1 | * | 3/2006 | Nakagawa et al. | 398/183 |
| 2006/0062582 | A1 | * | 3/2006 | Suzuki et al. | 398/183 |
| 2006/0067707 | A1 | | 3/2006 | Maniam et al. | |
| 2007/0092257 | A1 | * | 4/2007 | Smith et al. | 398/135 |
| 2007/0223470 | A1 | * | 9/2007 | Stahl | 370/389 |

FOREIGN PATENT DOCUMENTS

| JP | 02-224536 | | 9/1990 |
|---|---|---|---|
| JP | 05075672 | | 3/1993 |
| JP | 2003134131 | | 5/2003 |
| JP | 2004193898 | | 7/2004 |
| JP | 2004221747 | | 8/2004 |
| JP | 2005218066 | | 8/2005 |
| JP | 2005218067 | | 8/2005 |
| JP | 2005260380 | | 9/2005 |
| JP | 200674323 | | 3/2006 |
| JP | 2006109461 | | 4/2006 |
| JP | 2006115539 | | 4/2006 |
| WO | WO/2004/038962 | * | 5/2004 |

OTHER PUBLICATIONS

International Search Report dated Apr. 3, 2007.

* cited by examiner

*Primary Examiner* — Nathan M Curs
(74) *Attorney, Agent, or Firm* — Dickinson Wright PLLC (57) ABSTRACT

A PLC modem performs communication via transmission lines made of a pair of cables as an example of a wired transmission line. Data displaying an operation state of the PLC modem is transmitted to a light emitting part via a modulator, and is converted into a high-speed flash signal for output.

8 Claims, 10 Drawing Sheets

200~~# VISIBLE LIGHT COMMUNICATION APPARATUS AND VISIBLE LIGHT COMMUNICATION METHOD

INCORPORATION BY REFERENCE

This application is related to the following patent application which is hereby incorporated by reference in its entirely: US 2006/0056855 A1, ILLUMINATIVE LIGHT COMMUNICATION DEVICE, Inventors: Masao Nakagawa et al., filed on Oct. 23, 2003.

BACKGROUND

1. Field of the Invention

The present invention relates to a visible light communication apparatus that performs visible light communication by using a modulation signal for changing an emitting state of visible light, and a visible light communication method that outputs an operation state of an electric appliance.

2. Description of Related Art

When displaying states of various electric appliances including a communication apparatus, various devices are used including a basic spot-like display such as an LED or a lamp (hereinafter referred to as a "spot-display device") and a 2D-display device such as a CRT display and an LCD (hereinafter referred to as a "panel display device").

When displaying a state by using a spot-display device, a plurality of states are distinctively displayed by luminous timings such as continuous lightings, lights-out and blinks, or luminous colors. Providing a spot-display device, which is capable of displaying various states, error areas and the like, makes it possible to indicate various conditions of an electric appliance including whether the electric appliance is on or off and whether an error has occurred or not.

However, there is a limit to the number of states that a spot-display device can display, and it is usually difficult to display a detailed state. Further, since it is necessary to provide different spot-display devices for displaying various items in accordance with the device types and contents to be displayed (e.g., operation/non-operation of an electric appliance, states of device components, states of connected devices), it is difficult to display all the states of device types and contents when there is a physical limit to areas where spot-display devices can be installed. Moreover, users may have a hard time understanding display contents since various states are specified by continuous lightings, lights-out, blinks, etc.

When displaying a state by a panel display device, on the other hand, letters and the like can be displayed, thus achieving a further detailed display. It is also possible to display troubleshooting procedures suitable for various situations when abnormal states or the like occur. However, some electric appliances are difficult to install such panel display devices due to physical and limitations. Further, in some cases, depending on where such electrical appliances are installed, it may be hard for users to view the panel display devices on those appliances directly, thereby hindering users' recognition of the displayed contents themselves.

In general, a communication apparatus such as a power line carrier communication modem displays a communication state and the like by using a spot-display device. For instance, the data communication modem apparatus disclosed in Japanese Patent Laid-Open Publication H5-75672 uses one LED to display one of the following states: performing no communication, being connected to the line, and transmitting data. The wireless communication apparatus disclosed in Japanese Patent Laid-Open Publication 2003-134131 includes a state display including a plurality of colors of LEDs for displaying operation states. Therefore, such a communication apparatus is not capable of displaying detailed states including whether the communication apparatus is being connected or not, a state of a connected communication apparatus, and a state of a transmission line.

In recent years, an information communication method called visible light communication has been proposed (Refer to URL: http://www.vlcc.net/). Visible light communication performs communication using light that is perceivable by the human eye (visible light). In visible light communication, a visible light emitting device such as an LED undergoes high-speed modulation for data transmission. Since a visible light zone is safe to human, it can be transmitted while maintaining a high power level of a few watts used for lighting. Therefore, simply adding communication functions to a lighting device or the like can easily build a wireless environment. Further, there are suggestions of lighting optical communication utilizing illuminated light sources, and ITS visible light communication utilizing a signal or automobile light.

SUMMARY

A present embodiment is provided to address the above-described problems. The purpose of the present embodiment is to provide a visible light communication apparatus and a visible light communication method that are capable of outputting detailed information regarding operation states without a large display.

The visible light communication apparatus according to the present embodiment performs communication using visible light. The visible light communication apparatus includes a light emitting part that outputs the visible light, a state detector that detects an operation state of the visible light communication apparatus, and a modulator that modulates the visible light output from the light emitting part based on a modulation signal, which indicates an operation state detected by the state detector.

The visible light communication apparatus is capable of outputting detailed information regarding operation states without a large display. The visible light communication apparatus further allows easy and detailed recognition of an operation state of the visible light communication apparatus by receiving, at a receiver, visible light emitted from the visible light communication apparatus without a large display, which includes a receiving unit and a display.

A visible light communication method according to the present embodiment performs communication using visible light. The visible light communication method outputs the visible light, detects an operation state of the visible light communication apparatus, which performs the visible light communication method, and modulates the output visible light based on a modulation signal indicating the detected operation state.

The present embodiment can provide the visible light communication apparatus and the visible light communication method that are capable of outputting detailed information regarding operation states without a large display.

DETAILED DESCRIPTION

The present embodiment is described in the following with reference to the drawings, using as an example a PLC modem, which is a communication apparatus that performs power line communication.

The PLC modem according to the present embodiment performs communication using, for instance, an OFDM (Orthogonal Frequency Division Multiplexing) method in which a plurality of sub-carriers are transmitted.

Figure 1:
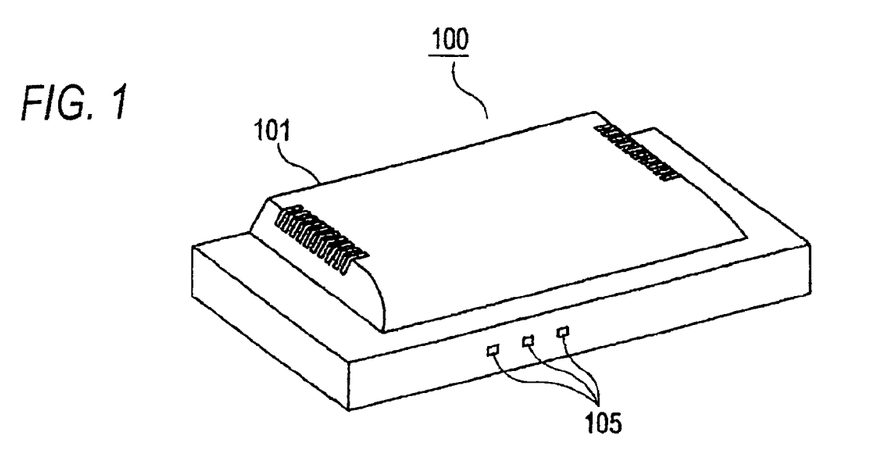
FIG. 1 is an external perspective view of a front side of a communication apparatus according to an embodiment.

PLC modem 100 is an example of the visible light communication apparatus and includes chassis 101. As shown in FIG. 1, light emitting portion 105 utilizing such luminous bodies as LEDs (Light Emitting Diodes) is provided on the front side of chassis 100. Light emitting portion 105, which indicates an operation state of PLC modem 100, includes three parts for emitting visible light as shown in FIG. 1. Although the number of parts of this portion can be set arbitrarily, a luminous body is provided at least in one part to enable high-speed flashing. Visible light is defined here as light that is perceivable, or more specifically as electromagnetic waves with a wavelength of 400 nm-700 nm. Any luminous color can be used for the luminous body of light emitting portion 105. Also, a different type of luminous body other than an LED can be used as long as it is capable of high-speed flashing.

Figure 2:
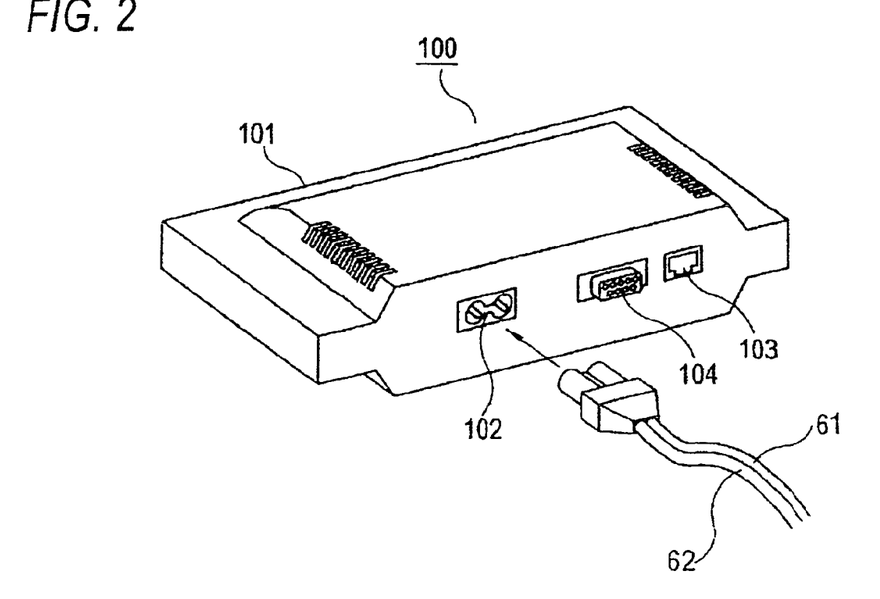
FIG. 2 is an external perspective view of a rear side of the communication apparatus according to the embodiment.

As shown in FIG. 2, power connector 102, LAN (Local Area Network) modular jack 103, such as RJ45, and Dsub connector 104, are provided on the rear side of chassis 101. As shown in FIG. 2, a pair of transmission lines (power lines) 61 and 62 such as parallel cables are connected to power line connector 102. A LAN cable (not shown) is connected to modular jack 103. A Dsub cable (not shown) is connected to Dsub connector 104. Although the PLC modem as shown in FIGS. 1 and 2 is indicated an example of a communication apparatus that performs power line communication, the communication apparatus can be provided as a visible light communication apparatus equipped with a modem.

Figure 3:
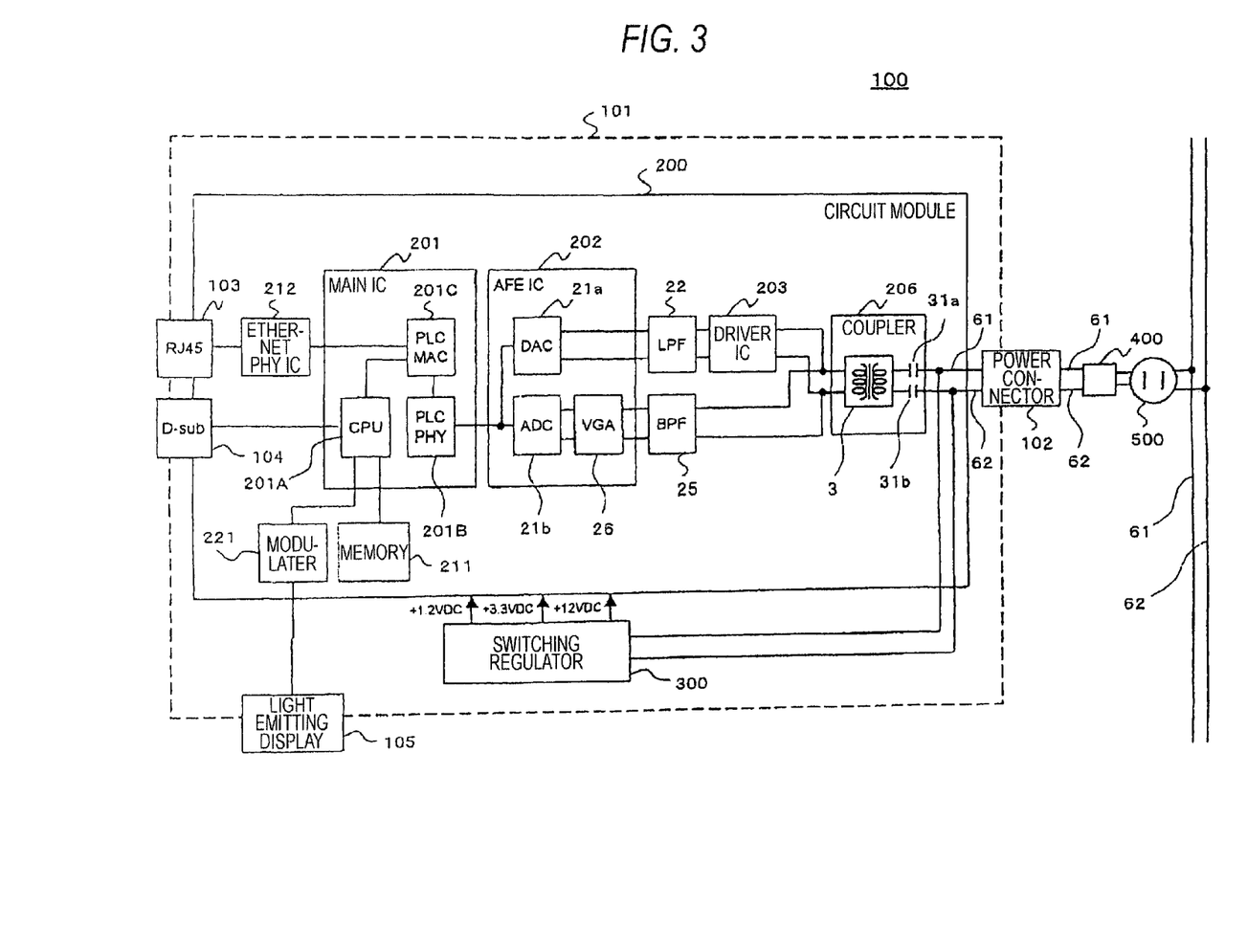
FIG. 3 is a block diagram illustrating a hardware example of the communication apparatus according to the embodiment.

As shown in FIG. 3, PLC modem 100 includes circuit module 200 and switching regulator 300. Switching regulator 300 supplies voltages of various levels (e.g., +1.2V, +3.3V, +12V) to circuit module 200. Circuit module 200 includes main IC (Integrated Circuit) 201, AFE IC (Analog Front End IC) 202, low pass filter (transmission filter) 22, driver IC 203, coupler 206, band pass filter (reception filter) 25, memory 211, Ethernet PHY IC 212 and modulator 221. Power connector 102 is connected to a pair of power lines 61 and 62 via plug 400 and power outlet 500. Modulator 221 at least includes a switching element. Such a switching element can be made of anything as long as it is capable of handling wavelengths on the order of kHz-MHz, and PIN (p-intrinsic-n) diodes are one such example. Modulator 221 can also be provided in the main IC.

Main IC 201 functions as a communication unit. Main IC 201 includes CPU (Central Processing Unit) 201A, PLC MAC (Power Line Communication/Media Access Control layer) block 201C, and PLC PHY (Power Line Communication/Physical layer) block 201B. CPU 201A is equipped with a 32-bits RISC (Reduced Instruction Set Computer) processor. PLC MAC block 201C controls an MAC layer of a transmitted signal; and PLC PHY block 201B controls a PHY layer of a transmitted signal. AFE IC 202 includes DA converter (DAC) 21a, AD converter (ADC) 21b and variable gain amplifier (VGA) 26. Coupler 206 includes coil transformer 3 and coupling condensers 31a and 31b.

PLC modem 100 as shown in FIGS. 1 through 3 performs communication via the pair of transmission lines 61 and 62 as power lines as an example of a wire transmission line.

PLC PHY block 201B of main IC 201 generates digital transmission signals through modulation of digital transmission data, and generates digital reception data through demodulation of digital reception signals. PLY PHY block 201B further controls signal transmission lines, gains and the like of respective analog circuit components such as AFE IC 202, low pass filter (transmission filter) 22, driver IC 203 and band pass filter (reception filter) 25. Modulation and demodulation processes at PLC PHY block 201B use a plurality of sub-carriers through, for instance, OFDM (Orthogonal Frequency Division Multiplexing), which uses a wavelet transform. Such a wavelet transform generally involves a cosine filter bank for communication.

In the analog circuit unit including AFE IC 202, lower pass filter (transmission filter) 22, driver IC 203 and band pass filter (reception filter) 25, a digital transmission signal is transmitted via DAC 21a, low pass filter (transmission filter) 22 and driver IC 203. Further, digital reception signal 1a is obtained via band pass filter (reception filter) 25, VGA 26 and ADC 21b.

DAC 21a converts a digital transmission signal from PLC PHY block 201B into an analog transmission signal. ADC 21b converts an analog reception signal from VGA 26 into a digital reception signal. Low pass filter (transmission filter) 22 eliminates harmonic noise occurred through DA conversion at DAC 21a. Driver IC 203 amplifies power for transmitting an analog transmission signal, whose gain can be modified by a control signal from PLC PHY block 201B.

Band pass filter (reception filter) 25 eliminates frequency noise outside a communication band. VGA 26, which amplifies an analog reception signal, adjusts the voltage of an analog reception signal to adapt to the resolution power of ADC 21b.

Coil transformer 3 insulates communication signals in a primary circuit on the communication apparatus side from communication signals in a secondary circuit on the transmission line side to enable signal transmission/reception.

CPU 201A of main IC 201 controls the entire PLC modem by utilizing various data stored in memory 211. CPU 201A performs processes including a detection process, an output process and a notification process. A detection process includes detecting an operation state of the PLC modem (a detector function). "Operation state" indicates a state relating to a communication operation performed by the visible light communication apparatus, including a communication quality and a communicating party. Communication quality includes, for instance, a transmission line state between different PLC modems, and a state indicating a PLC modem error. Communicating party states indicate, for instance, which PLC modem is linked to the visible light communication apparatus, and information regarding the other PLC modem (e.g., identification information uniquely specifying the PLC modem) and the like. "Error" indicates a state where functions of the visible light communication apparatus are not normally performed, and includes two types of error, i.e., an internal error intrinsic to the visible light communication apparatus and an external error extrinsic to the visible light communication apparatus. An internal error occurs, for instance, when an internal program does not normally operate; and an external error occurs, for instance, when communication is disabled due to a lower impedance of the power line caused by other electric appliances or due to noise generated from other electric appliances. Both errors can be detected by determining whether a predetermined parameter has exceeded a predetermined range.

An output process is for outputting display data, which indicates a detected operation state, after converting the display data into a visible high-speed flash signal of light emitting portion 105 through modulator 221. A notification process is for notifying when an operation state change has reached a predetermined level (a notification unit function). Such a process for notifying an operation state change can be omitted. These processes will be described later.

Modulator 221 performs a modulation process for converting display data, which indicate an operation state of the PLC modem, into a visible light high-speed flash signal of light emitting portion 105. For instance, modulator 221 outputs a modulation signal for changing ON/OFF of visible light by using ON-OFF keying modulation (i.e., ASK (Amplitude Shift Keying)). Frequencies of a modulation signal are on the order of kHz-MHz. For instance, when display data, which indicate an operation state, are indicated as binary numbers of "0" and "1", the ON/OFF modulation signal can be synchronized with the display data. As a result, the modulation signal displays an operation state. A switching rate, which represents a rate of ON period against OFF period, may be described as the frequency.

Also, it is possible to notify when an operation state change has reached a predetermined level by changing a light emitting state to a perceivable level (a notifying unit function). Since a unit used for infrared communication can be used for modulator 221, its detailed descriptions are omitted. When performing visible light communication using CPU 201A, modulator 221 and light emitting portion 105, light does not need to be completely shut off while light emitting portion 105 performs high-speed flashing as long as the emission intensity (e.g., lumen, lux, and candela) is perceivable at a receiver. Such visible light communication does not need to be performed by high-speed flash technology, but can be performed by changing, at high speed, a luminous color through outputting a modulation signal for the emission intensity of each color (e.g., lumen, lux, and candela) of RGB, which is included in LED. Here, "high-speed" refers to a speed that is so fast that such a change is not perceivable by the human eye, more specifically to a speed having a frequency at or more than 30 MHz.

Figure 4:
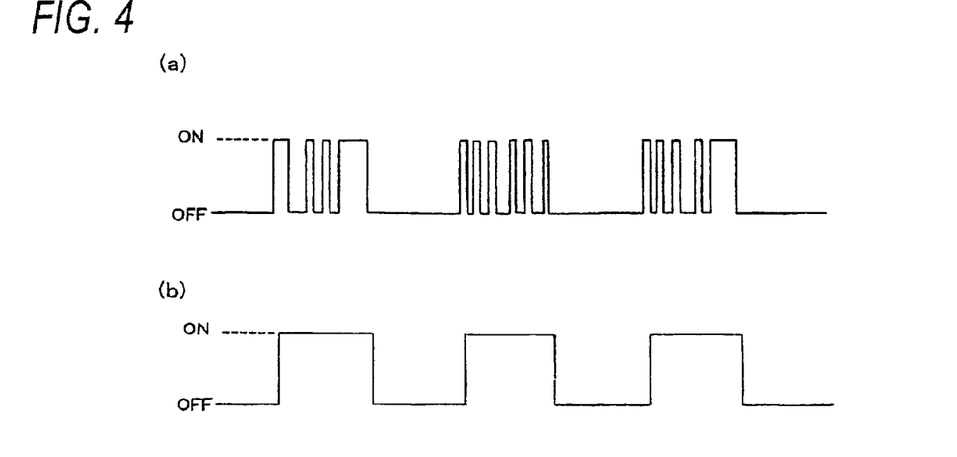
FIG. 4 shows an example of an output waveform from a modulator of the communication apparatus according to the embodiment.

In the FIG. 4 example, light emitting portion 105 flashes at a speed perceivable by but not invasive to the human eye. FIG. 4 (*a*) is a schematic view of an actual output waveform from modulator 221; and FIG. 4 (*b*) is a schematic view of a flashing state that is perceivable by the human eye. In other words, light emitting portion 105 flashes at a speed (e.g., at a frequency of 1-10 Hz) that allows the human eye to perceive when an operation state change of the PLC modem has reached a predetermined level (see FIG. 4 (*b*)); light emitting portion 105 outputs data necessary to display detailed information about operation states through performing high-speed flashing (see FIG. 4 (*a*)). The output waveform synchronizes with the modulation signal. Meanwhile, operation states of the visible light communication apparatus are indicated through various parameters related to operations of the visible light communication apparatus. In the case of a communication apparatus such as a PLC modem, such parameters include transmission speed, noise, reception level, error information, and the like. When an operation state change has reached a predetermined level, it means that these parameters have changed by predetermined margins, or predetermined margins vis-à-vis average or median value calculated over a predetermined period of time, thereby indicating that the operation state has changed from error-free to error-detected.

A process for notifying an operation state change, when an operation state change has reached a predetermined level, can be performed by using a change of a flashing state of light emitting portion 105 (not only by flashing when there is a change and keeping the light on when there is no change, but also by changing a flashing frequency or pattern) as well as by using a change of luminous colors of light emitting portion 105. In this case, a plurality of LEDs having different luminous colors are provided in a visible light emitting part of light emitting portion 105. Luminous colors are changed by switching LEDs to be illuminated. It is also possible to provide an LED specially designed to indicate a state change, apart from the LEDs for high-speed flashing, and notify the state change by flashing that LED or changing its luminous colors.

Further, it is possible to provide a tone signal output unit such as a buzzer and a speaker (not shown), the tone signal output unit being operated for notifying an operation state change when the operation state change has reached a predetermined level. Such a process for notifying an operation state change can be performed prior to a high-speed flashing of light emitting portion 105 or concurrently with the high-speed flashing output. A period of such output is also variable.

The following describes a general operation of the PLC modem shown in FIGS. 1 through 3. A digital transmission signal generated at signal transmission by PLC PHY block 201B is converted into an analog signal by DAC 21*a*, and drives coil transformer 3 via LPF 22 and driver IC 203. The digital transmitted signal is then output from transmission lines 61 and 62, which are connected to a secondary side of coil transformer 3.

At signal reception, a reception signal from power lines 61 and 62 is transmitted to reception BPF 25 via coil transformer 3, and undergoes a gain adjustment at VGA 26. The reception signal is then converted into a digital signal at ADC 21*b* and into digital data at PLC PHY block 201B. As conversion from digital data into a digital transmission signal at PLC PHY block 201B and from a digital reception signal into digital data is publicly known, its descriptions are omitted.

The following describes a process for notifying an operation state change in which detection of an operation state of the PLC modem, an output of the detected operation state change and a change of the operation state, by taking an example of detection/output of a transmission line state on which the PLC modem performs communication.

Figure 5:
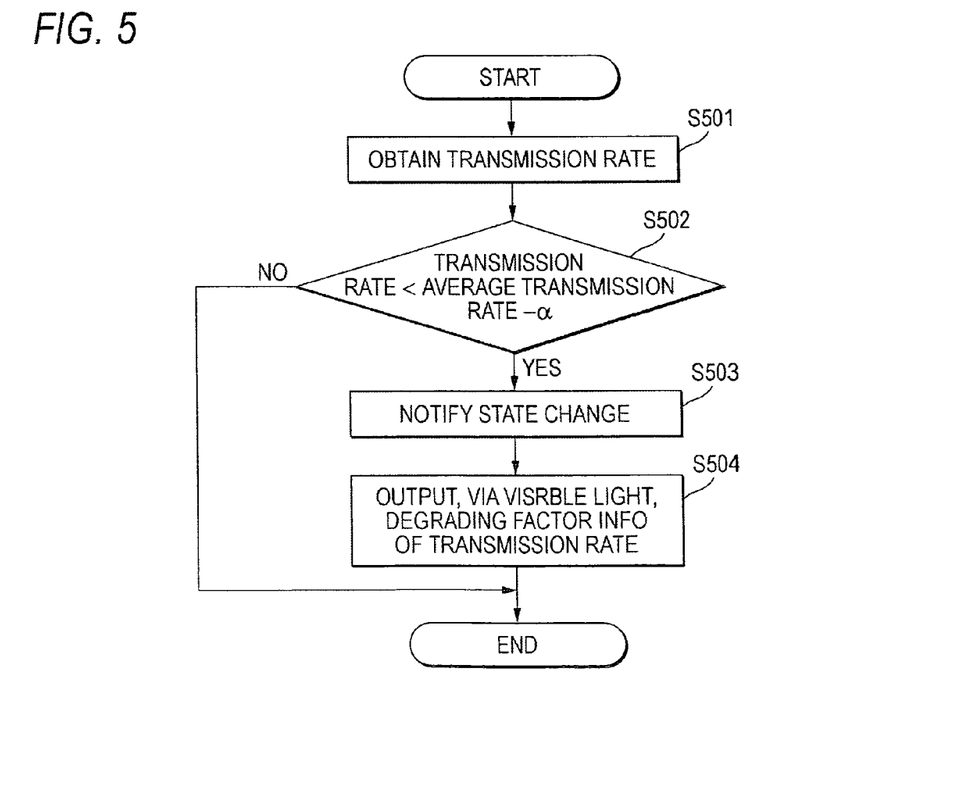
FIG. 5 shows an example of an operation flow when a transmission rate of the communication apparatus according to the embodiment is output as a modulation signal.

As shown in FIG. 5, a transmission rate is periodically obtained at step S501 (described later). At step S502, an obtained transmission rate is compared with [average transmission rate–α]. When the obtained transmission rate has exceeded [average transmission rate–α] (step S502: No), the process ends without any further action. Here, "average transmission rate" refers to an average transmission rate for a predetermined period (e.g., a period in which transmission line estimation is made, or a period in which communication is actually performed), and "a" is an offset value. Accordingly, information regarding an operating rate is not output when there is no significant reduction in the obtained transmission rate.

When the obtained transmission rate is lower than [average transmission rate–α] (step S502: Yes), it is notified that an operation state has significantly changed at step S503. As described above, such a notification of change is achieved through flashing of light emitting portion 105, change of luminous colors, or output of tone signals. A plurality of these notification methods can also be employed.

Next, at step 504, data for displaying a transmission rate and degrading factor information are output through visible light high-speed flashing. Such data for displaying degrading factors are pre-stored in memory 211. Information provided through visible light high-speed flashing is received by a visible light communication receiver, so that a method to eliminate degrading factors and the like can be recognized. The receiver itself is publicly known and its descriptions are thus omitted.

Figure 6:
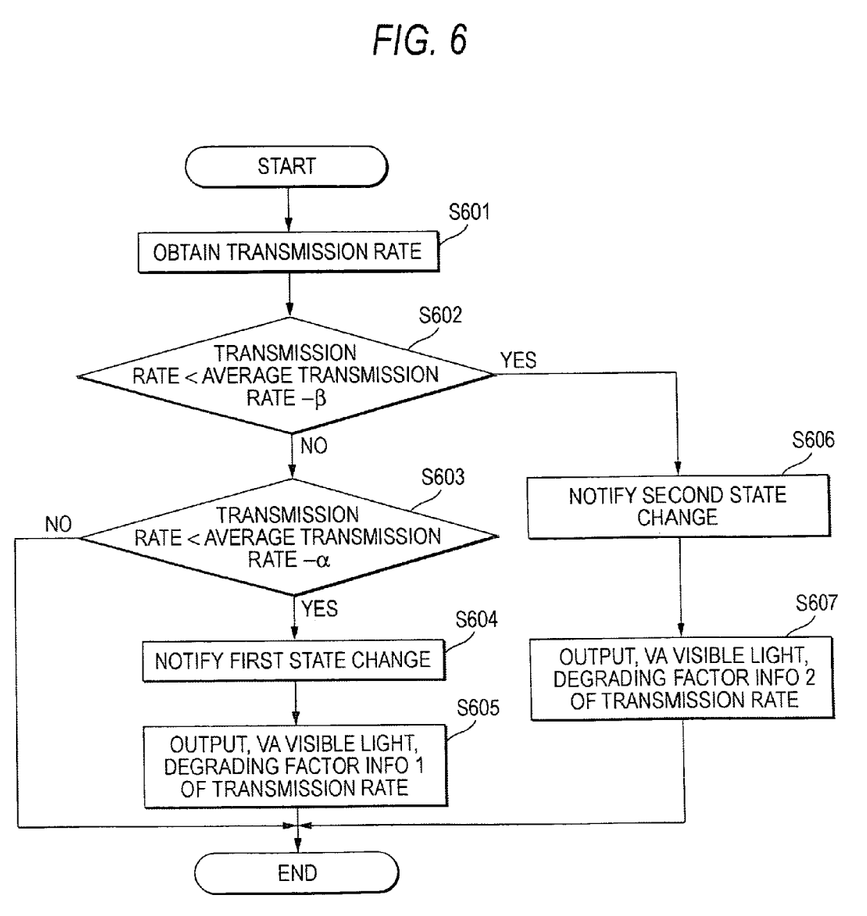
FIG. 6 shows another example of an operation flow when the transmission rate of the communication apparatus according to the embodiment is output as a modulation signal.

In the FIG. 6 flowchart, two offset values are set for comparing an obtained transmission rate with an average transmission rate. In other words, another notification, together with information regarding an operation state, is output when the obtained transmission rate has further decreased significantly from a level shown in the FIG. 5 example.

At step S601, a transmission rate is periodically obtained; and at step S602, an obtained transmission rate is compared with [average transmission rate–β]. Since β>α, it is determined, at step S602, whether the obtained transmission rate has significantly decreased from a level shown in the FIG. 5 example. When the obtained transmission rate is higher than [average transmission rate–β], the obtained transmission rate is compared with [average transmission rate–α] at step S603. When the obtained transmission rate is higher than [average transmission rate–α], the process ends without any further action.

When the obtained transmission rate is lower than [average transmission rate–α], a first state change notification is made at step S604, after which data are output for displaying a transmission rate and degrading factor information 1 through visible light high-speed flashing at step S605. The first state change notification and the degrading factor information 1 are identical to those respectively shown in the FIG. 5 example.

When it is determined, at step S602, that the obtained transmission rate is lower than [average transmission rate–β], a second state change notification is made at step S606, after which data are output for displaying the transmission rate and degrading factor information 2 through visible light high-speed flashing at step S607. When the obtained transmission rate is lower than [average transmission rate–β], it indicates that the transmission rate has significantly decreased. Therefore, the second state change notification requires more urgency than the first state change notification. For instance, flash frequency of light emitting portion 105 is set higher, a luminous color is set to red (when orange is used for the first state change notification) and the output level of a tone signal is set higher. Further, degrading factor information 2 is different from degrading factor information 1.

In the FIGS. 5 and 6 examples, data regarding transmission rates are output through visible light high-speed flashing only when transmission rates change significantly. In the FIG. 7 example, however, data regarding transmission rates are output regardless of the magnitude of transmission rate changes. Accordingly, users can obtain data regarding transmission rates whenever they are needed.

Figure 7:
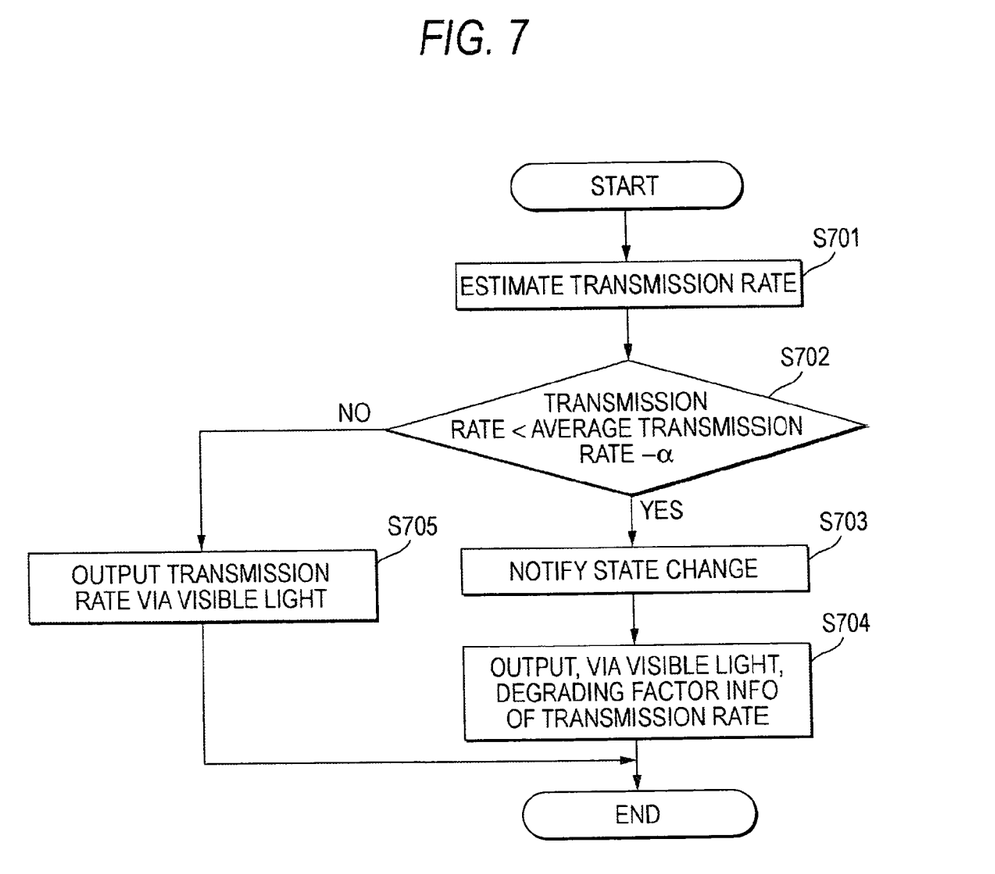
FIG. 7 shows another example of an operation flow when the transmission rate of the communication apparatus according to the embodiment is output as a modulation signal.

At step S701, a transmission rate is periodically obtained; and at step S702, an obtained transmission rate is compared with [average transmission rate–α]. When the obtained transmission rate is higher than [average transmission rate–α], data for displaying the transmission rate are output through visible light high-speed flashing at step S705. In this case, since there is no problem with the transmission line state, no state change notification is made.

When the obtained transmission rate is lower than [average transmission rate–α], the transmission rate and degrading factor information are output through visible light high-speed flashing at step S704. Steps S703 and 704 are identical to steps 503 and 504 of FIG. 5.

Figure 8:
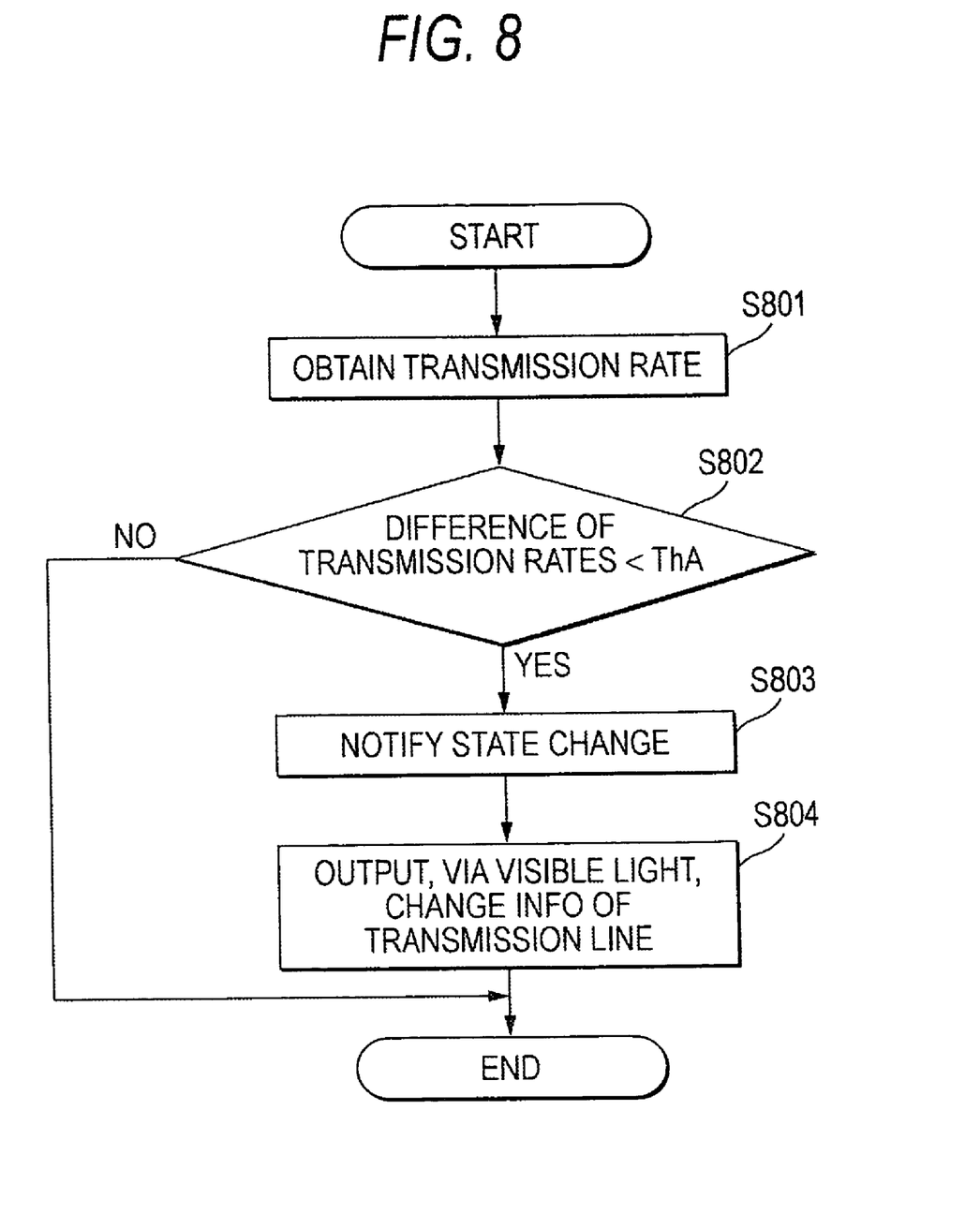
FIG. 8 shows another example of an operation flow when the transmission rate of the communication apparatus according to the embodiment is output as a modulation signal.

In the FIGS. 5, 6 and 7 examples, information regarding an operation state based on the comparison between the obtained transmission rate and the average transmission rate is output. In FIG. 8, on the other hand, information regarding transmission rate differences is output.

At step 801, a transmission rate is periodically obtained a plurality of times; and at step 802, it is determined whether the difference of transmission rates is higher than threshold ThA. Such a difference of transmission rates is calculated by using a difference from an average or median value of transmission rates obtained a plurality of times (e.g., obtained four times during a power frequency).

When the difference of the obtained transmission rates is lower than threshold ThA, the process ends without any further action. When the difference is higher than threshold ThA, the transmission line is expected to have fluctuation factors. Therefore, an operation state change is notified at step S803, and data displaying information regarding the change of the transmission line state is output through visible light high-speed flashing at step S804.

Figure 9:
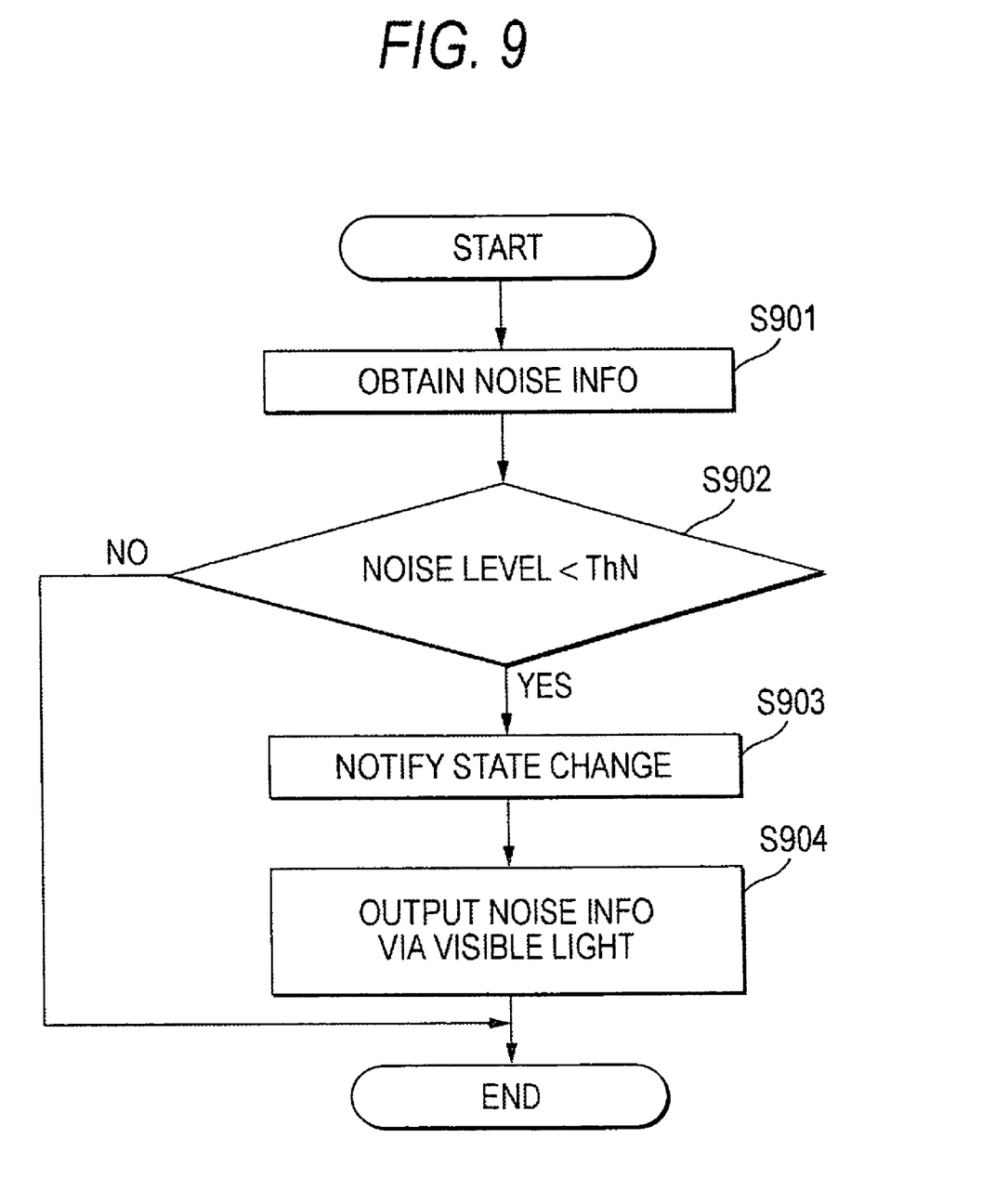
FIG. 9 shows another example of an operation flow when noise information of the communication apparatus according to the embodiment is output as a modulation signal.

As shown in FIG. 9, noise information is periodically obtained (described later) at step S801. The obtained noise information is compared with threshold ThN at step S902. When the obtained noise information is lower than threshold ThN, the process ends without any further action.

When the obtained noise information is higher than threshold ThN, the transmission line is expected to have fluctuation factors. Therefore, an operation state change is notified at step S903, and data displaying the noise information are output through visible light high-speed flashing at step S904.

Figure 10:
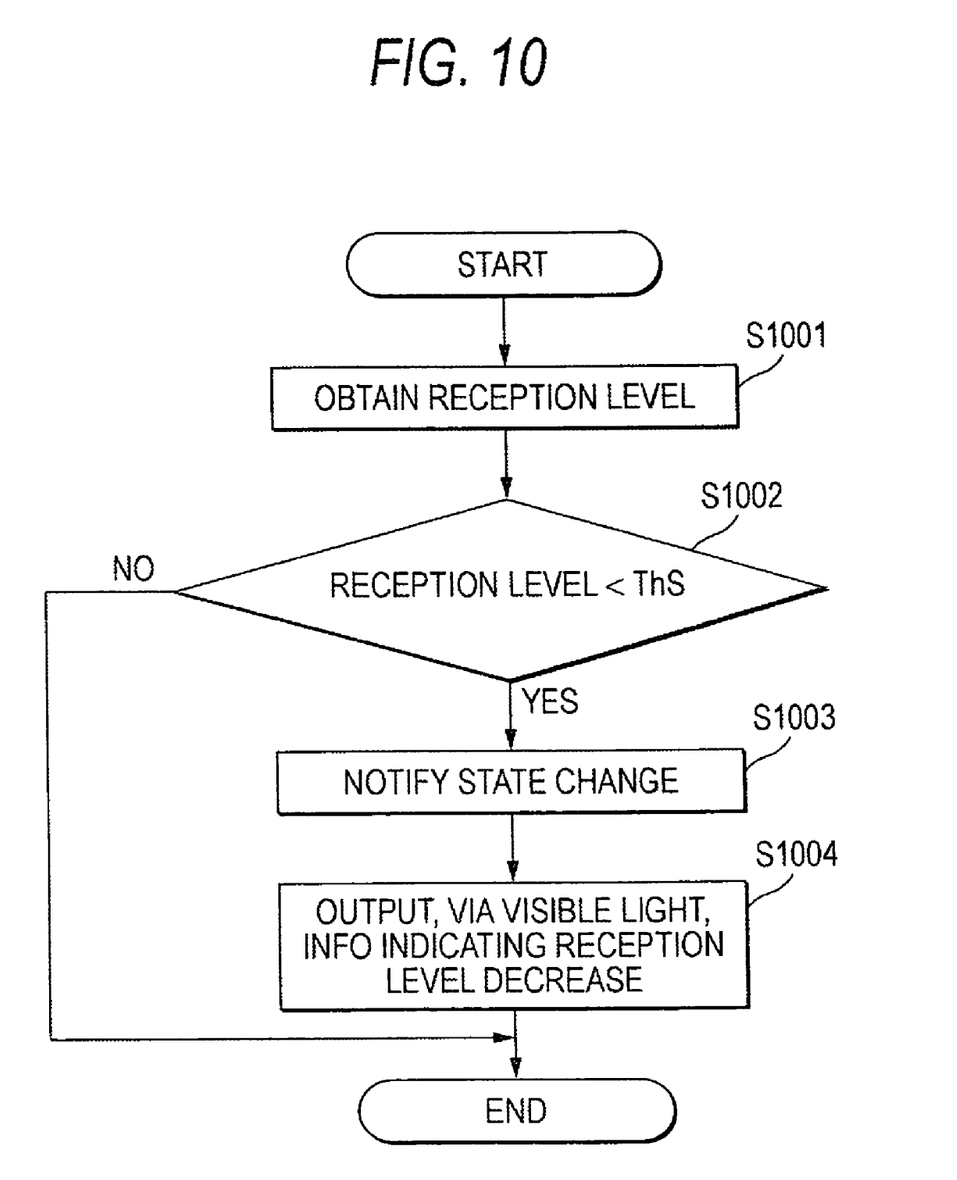
FIG. 10 shows another example of an operation flow when a reception level of the communication apparatus according to the embodiment is output as a modulation signal.

As shown in FIG. 10, a reception level is periodically obtained at step S1001. A reception level is obtained in the same way as noise information is obtained (described later). The obtained reception level is compared with threshold ThS at step S1002. When the obtained reception level is higher than threshold ThS, the process ends without any further action.

When the obtained reception level is lower than threshold ThS, the transmission line is expected to have fluctuation factors. Therefore, an operation state change is notified at step S1003, and data concerning the reception level decrease are output through visible light high-speed flashing at step S1004.

Figure 11:
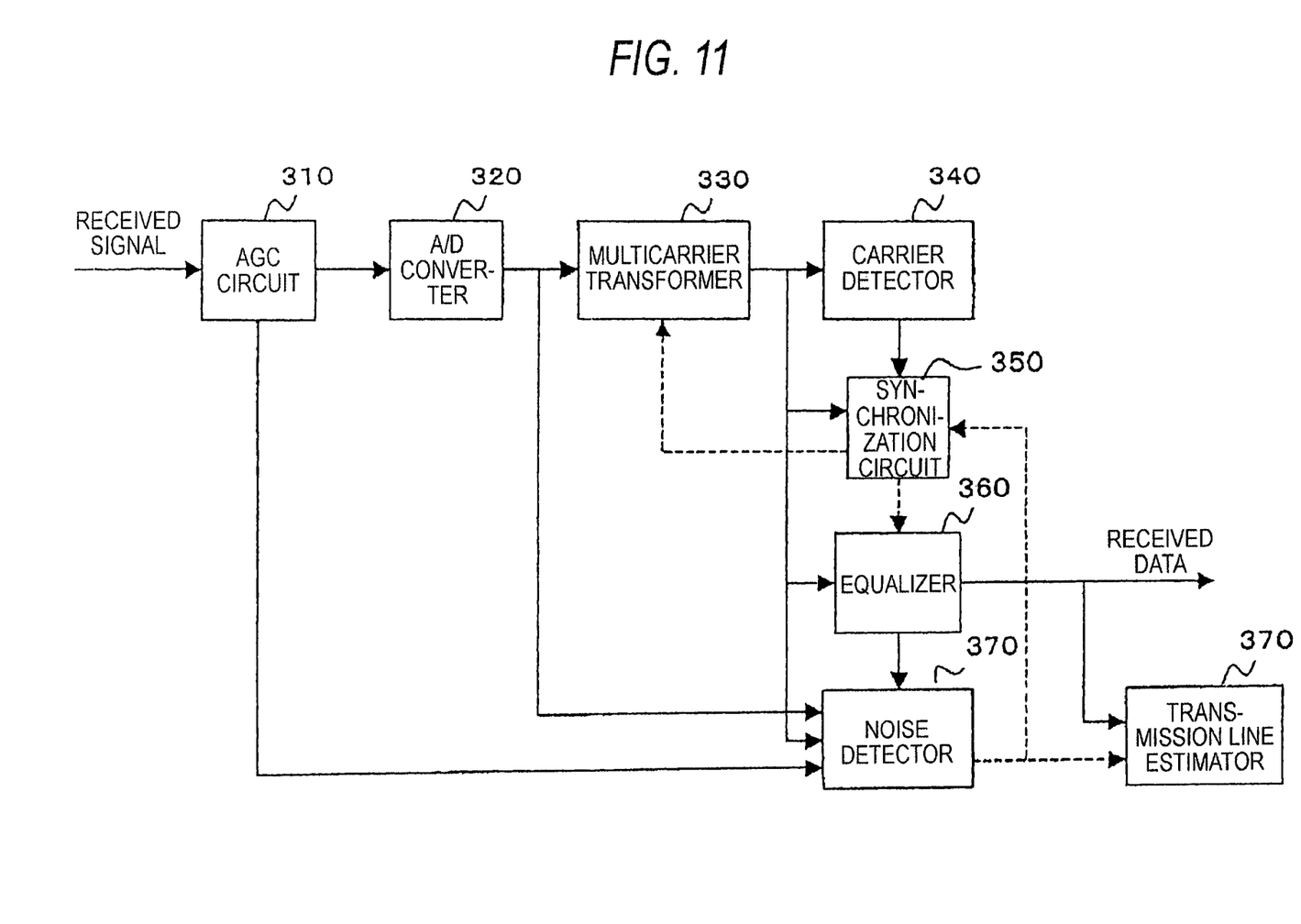
FIG. 11 is a diagram illustrating a process for obtaining a transmission rate, noise information and a reception level of the communication apparatus according to the embodiment.

The following describes a process for obtaining a transmission rate, noise information and a reception level. As shown in FIG. 11, the PLC modem includes AGC circuit 310, ADC 320, multi-carrier transformer 330, carrier detector 340, synchronization circuit 350, equalizer 360, noise detector 370 and transmission line estimator 380. These components are realized through specific hardware described in FIG. 3.

Components other than noise detector 360 and transmission line estimator 370 are functional components provided in a multi-carrier communication apparatus, and their descriptions are thus omitted.

Noise detector 360 detects a noise level during communication by the PLC modem. Outputs from AGC circuit 310, ADC 320, and multi-carrier transformer 330 are input. Based on outputs from AGC circuit 310 and ADC 320, a noise level in a time domain is calculated. Further, a noise spectrum in a frequency domain from AGC circuit 310, and from multi-carrier transformer 330 using an FFT or wavelet transformer is calculated. For such estimation, since it is difficult to obtain detailed noise information when the communication apparatus itself is performing communication, it is necessary to perform noise detection while the communication apparatus is not performing communication. In FIG. 11, outputs from AGC circuit 310, ADC 320 and multi-carrier transformer 330 are all input into noise detector 360. However, not all data need to be input.

A reception level is calculated by noise detector 360. Such a reception level calculation can be made any time while the communication apparatus is performing communication.

Transmission line estimator 370 outputs signals indicating a state of the transmission line by using received data from equalizer 360 and noise data from noise detector 370. More specifically, transmission line estimator 370 outputs signals indicating an estimated transmission rate. For transmission line estimation, a prepared frame for transmission line estimation is transmitted from a transmitter; and a transmission rate is obtained by the receiver using the frame for the transmission line estimation at transmission line estimator 370. Here, an output from noise detector 370 is input into transmission line estimator 370. This process is for accurate estimation of transmission rates and can be omitted.

The above descriptions explained detection of a state of the transmission line on which the PLC modem performs communication, as well as the output of such detection results. However, it is also possible to detect and output an error state of the PLC modem itself, a connection state with another PLC modem communicating with the PLC modem, and an operation state of another PLC modem.

Figure 12:
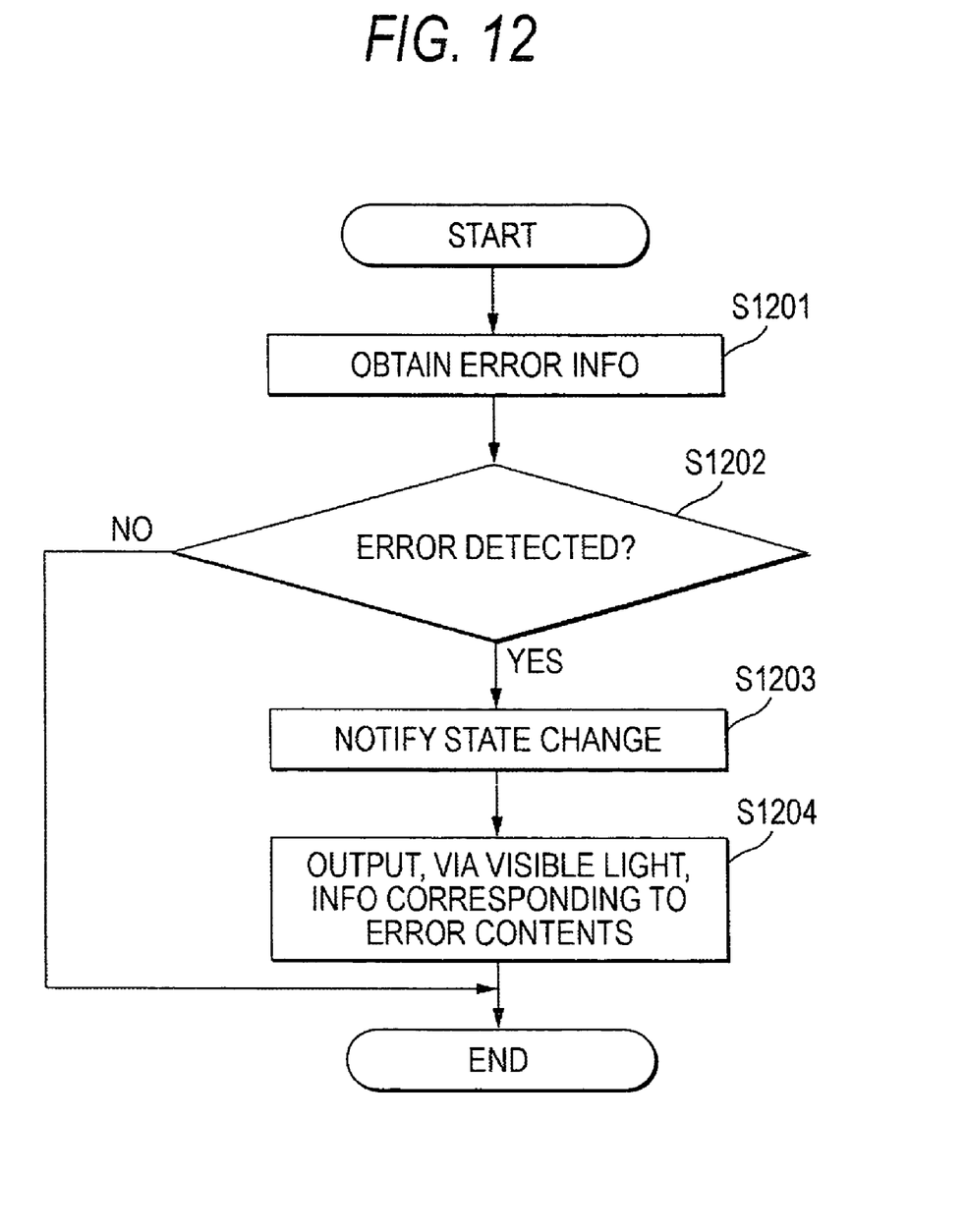
FIG. 12 shows an example of an operation flow when error information of the communication apparatus according to the embodiment is output as operating information.

As shown in FIG. 12, error information is periodically obtained at step S1201. Such error information includes, for instance, errors of the PLC modem itself, or the disappearance of "master vis-à-vis slave" in a master-slave setup in which the PLC modem constitutes a network with another PLC modem.

At step S1002, it is determined whether an error has occurred based on the obtained error information. When no error has occurred, the process ends without any further action. When it is determined, at step S1002, that an error has occurred, it is notified that an operation state has been significantly changed at step S1203. Such a notification includes flash of limit emitting portion 105, change of luminescent colors, and output of tone signals. A plurality of these notifications can be used.

Next, at step S1204, data displaying information corresponding to an error is output through visible light high-speed flashing. Such data displaying information corresponding to an error is pre-saved in memory 211. Information displayed through visible light high-speed flashing is received by a receiver of visible light communication, and detailed information for dealing with an error can be displayed.

In the above-described operation flow, a process for notifying an operation state change is performed by determining whether there has been a state change. However, these processes for determining and notifying an operation state change can be omitted. As an alternative, it is also possible to change only data output through visible light after performing only a determination process. Output through visible light during the operation can be made despite an operation state change as described in FIG. 7.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

The modulation signal is not limited to the frequency or the switching rate. The modulation signal may represent frequency of the visible light within a wavelength of 400 nm-700 nm for example.

This application is based on the Japanese Patent Application No. 2005-321126 on Nov. 4, 2005, entire content of which is expressly incorporated by reference herein.

What is claimed is:

1. A visible light communication apparatus for performing communication using visible light, the visible light communication apparatus comprising:
   a communication unit that performs communication with another communication apparatus;
   a state detector that detects a transmission rate of a signal transmitted over a transmission line between the visible light communication apparatus and the another communication apparatus;
   a controller that generates a first signal and a second signal based on the transmission rate detected by the state detector, the first signal indicating the transmission rate is decreased more than a given amount relative to an average transmission rate over a predetermined period, and the second signal including detailed information regarding the transmission rate;
   a modulator that modulates the first signal at a first frequency and modulates the second signal at a second frequency, the first frequency being lower than the second frequency; and a light emitting part that outputs the modulated first and second signals as visible light having first and second flashing patterns that are different from each other, the second flashing pattern providing said detailed information.

2. The visible light communication apparatus according to claim 1, wherein the light emitting part outputs the modulated first and second signals in synchronism.

3. The visible light communication apparatus according to claim 1, wherein the light emitting part begins to output the modulated second signal after beginning of outputting of the modulated first signal.

4. The visible light communication apparatus according to claim 1, wherein the modulator modulates the first signal at the first frequency so that the flashing pattern of the light emitting part is at a perceivable level by the human naked eye.

5. The visible light communication apparatus according to claim 1, wherein the modulator modulate the second signal at the second frequency so that the flashing pattern of the light emitting part outputs is not at a perceivable level by the human naked eye.

6. The visible light communication apparatus according to claim 1, the second frequency is on the order of kHz-MHz.

7. The visible light communication apparatus according to claim 1, the communication unit performs power line communication with the another communication apparatus.

8. A visible light communication method for performing communication by a visible light communication apparatus, the method comprising:
  (a) performing communication with another communication apparatus;
  (b) determining a transmission rate of a signal transmitted over a transmission line between the visible light communication apparatus and the another communication apparatus;
  (c) generating a first signal and a second signal based on the transmission rate detected by step (b), the first signal indicating the transmission rate is decreased more than a given amount relative to an average transmission rate over a predetermined period, and the second signal including detailed information regarding the transmission rate;
  (d) modulating the first signal at a first frequency and the second signal at a second frequency, the first frequency being lower than the second frequency; and
  (e) outputting the modulated first and second signals as visible light having first and second flashing patterns that are different from each other, the second flashing pattern providing said detailed information.

* * * * *